R. E. HELLMUND.
SYSTEM OF CONTROL.
APPLICATION FILED APR. 29, 1915.

1,287,017.

Patented Dec. 10, 1918.
4 SHEETS—SHEET 1.

WITNESSES:
R. J. Fitzgerald
J. C. Davis.

INVENTOR
Rudolf E. Hellmund.
BY
Wesley G. Carr
ATTORNEY

R. E. HELLMUND.
SYSTEM OF CONTROL.
APPLICATION FILED APR. 29, 1915.

1,287,017.

Patented Dec. 10, 1918.
4 SHEETS—SHEET 2.

WITNESSES:
R. J. Fitzgerald
D. C. Davis.

INVENTOR
Rudolf E. Hellmund.
BY
Wesley G. Carr
ATTORNEY

R. E. HELLMUND.
SYSTEM OF CONTROL.
APPLICATION FILED APR. 29, 1915.

1,287,017.

Patented Dec. 10, 1918.
4 SHEETS—SHEET 3.

WITNESSES:
Fred A. Lind.
D. C. Davis.

INVENTOR
Rudolf E. Hellmund
BY
ATTORNEY

R. E. HELLMUND.
SYSTEM OF CONTROL.
APPLICATION FILED APR. 29, 1915.

1,287,017.

Patented Dec. 10, 1918.

WITNESSES:

INVENTOR
Rudolf E. Hellmund.
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,287,017.

Specification of Letters Patent.

Patented Dec. 10, 1918.

Application filed April 29, 1915. Serial No. 24,740.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to dynamo-electric machines of the alternating-current commutating type, and it has for its object to provide means whereby the load power factor and speed characteristics of apparatus of the character specified may be adjusted and modified as desired and whereby substantially sparkless commutation may be obtained under all load conditions.

In connection with alternating-current systems of distribution, it is frequently desirable to employ dynamo-electric machines of the commutating type because of many inherent advantages of this class of apparatus. Unfortunately, however, the power factor of these machines is quite low, under certain conditions, the speed characteristics, when employed as motors, are not suitable for certain classes of work and, furthermore, as ordinarily designed, it is difficult to prevent sparking at the commutators under all conditions of load. By my invention, I am enabled to overcome all of these defects in a simple and effective manner.

Figure 1:
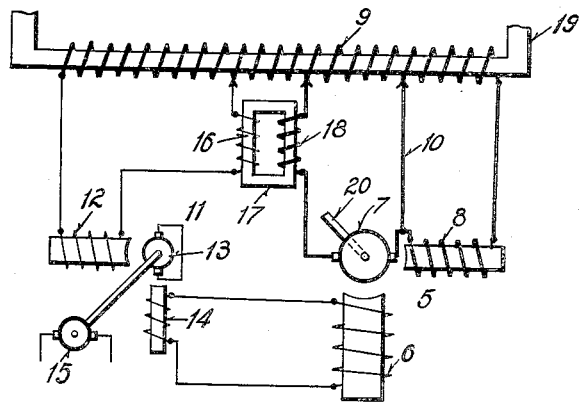
Figure 5:
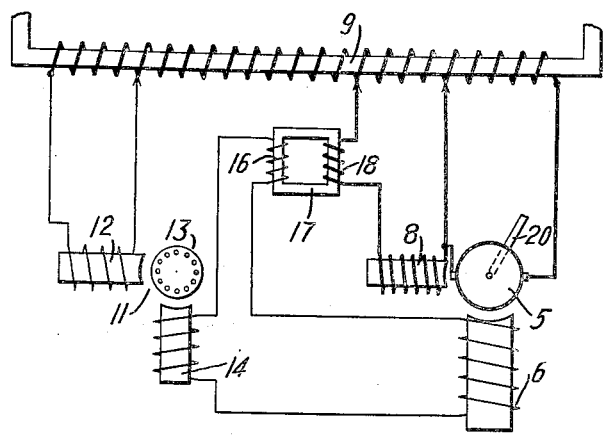
Figure 6:
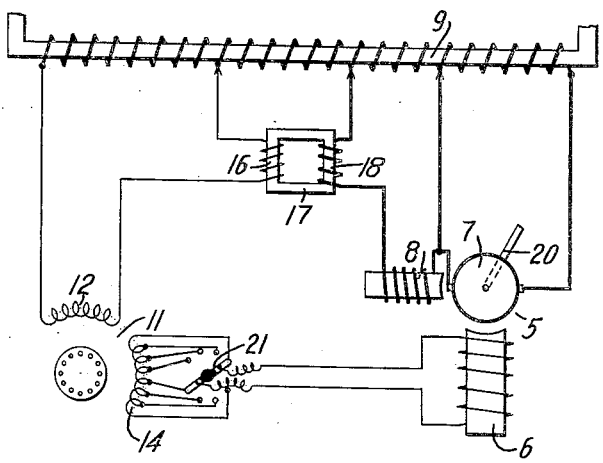
Figure 7:
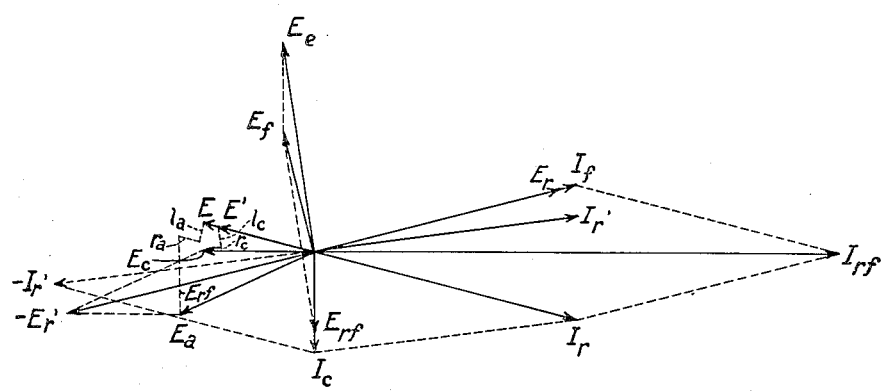
Figure 8:
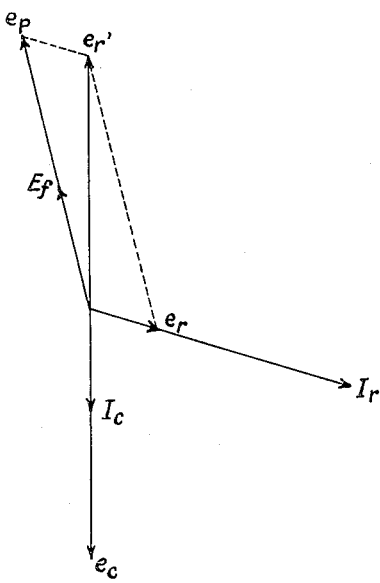

Referring to the accompanying drawing, Figure 1 is a diagrammatic view of an alternating-current motor of the compensated commutating type, together with an auxiliary exciting circuit, constructed in accordance with my invention; Figs. 2, 3, 4, 5 and 6 are diagrammatic views of modifications of the circuit of Fig. 1; and Figs. 7 and 8 are vector diagrams illustrating the operation of my system.

Referring more particularly to the form of my invention shown in Fig. 1, a dynamo-electric machine 5 of the commutating compensated type is connected to a vehicle axle 20 and is provided with a main field winding 6, an armature 7 and a compensating or cross field winding 8. Current for the motor 5 may be derived from any suitable source, such, for example, as the secondary winding 9 of a transformer 19. The motor is connected to the source 9 in accordance with the well known doubly-fed connection wherein an intermediate conductor 10 connects a point between the armature 7 and the cross field winding 8 with the source 9. In this manner, the voltages impressed upon these two portions of the motor may be varied independently, as is well known in the art. The main field winding 6 of the motor 5 is energized from a separate exciting machine 11, preferably of the short-circuited armature commutating type. Said machine comprises a main field winding 12, an armature 13 and a cross or generating field winding 14, the latter being connected directly to the main field winding 6 of the machine 5. Driving torque for the armature 13 may be obtained in any convenient manner, such, for example, as from a separate motor 15 or from a car axle. The main field winding 12 is excited partially by a portion of the source 9 and partially by the secondary winding 16 of a transformer 17, the primary winding 18 of which is connected in series with the main armature circuit of the machine 5. It will thus be observed that the electromotive force impressed upon the winding 12 will be the vector sum of the electromotive forces of the portion of the winding 9 and of the secondary winding 16. As the load on the motor 5 changes, the voltage produced in the winding 16 will change, with consequent alteration both of the strength and phase relation of the resultant voltage impressed upon the winding 12. The voltage generated by the winding 14 differs from that impressed upon the winding 12 by a substantially fixed phase angle, that is determined by the relative arrangement of the different parts of the machine 11 and will be varied accordingly. Hence the excitation of the main field winding 6 will be varied, both in strength and in phase, by changes in the load on the motor 5. In this manner, by suitable strengthening of the field 6, upon an increase of the load, the steepness of the speed characteristic of the motor 5 may be increased to any desired degree, thus rendering the motor suitable for traction purposes. At the same time, the shifting of the phase angle in the current of the winding 6 will maintain the power factor within reasonable limits, and the commutation may be controlled to a certain extent.

The steepness of the speed characteristic of the motor 5 may be still further increased by exciting the winding 12 entirely from the winding 16, thus causing the excitation produced by the machine 11 to vary in a more marked degree upon changes in the load of the motor 5.

Figure 2:
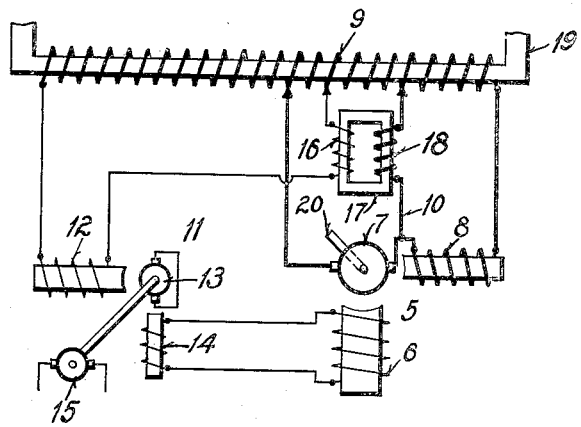

Referring to the form of my invention shown in Fig. 2, the connections are the same as in Fig. 1, with the exception that the primary winding 18 of the transformer 17 is inserted in the intermediate connection 10 rather than in the main motor circuit. By this means, a much more effective control of commutation may be obtained, owing to the fact that the current in the lead 10 is of a different character and, hence, is subject to large percentage changes for relatively small load changes in the motor 5.

Figure 3:
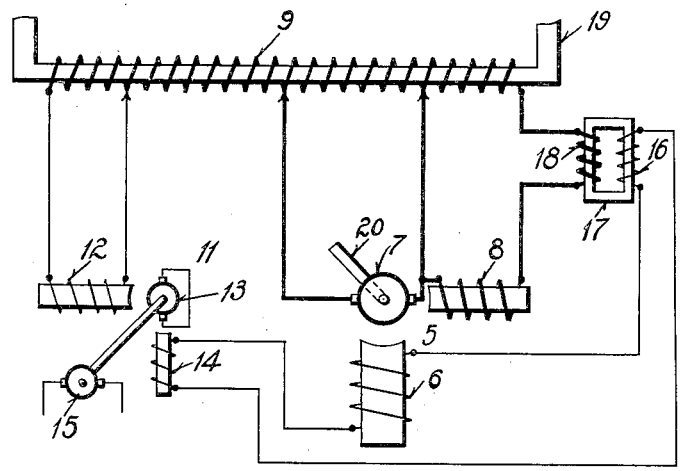

It may frequently happen that it is desirable to combine the induced electromotive force of the auxiliary machine with an electromotive force which varies in accordance with the load on the main motor rather than in allowing the variations in the motor load to affect the excitation of the auxiliary machine. Such a connection is shown in Fig. 3 wherein the main field winding 12 of the auxiliary machine 11 is excited solely from a portion of the source 9 and thus produces a substantially constant electromotive force in the winding 14, differing therefrom in phase. Instead, however, of having the generating winding 14 excite the main field winding 6 directly, its effect is combined with that of the secondary winding 16 of a transformer 17, the primary winding 18 of which is connected in the cross field winding circuit of the motor 5. The resultant phase correction imposed by the secondary winding 16 upon the excitation of the field winding 6 will differ by substantially 90° from that which is present in the circuits of Figs. 1 and 2 and, hence, its effect will be much more pronounced upon the power factor of the motor 5 than was the case with the earlier connection and will be much less apparent in its effect upon the speed characteristic of the motor.

Figure 4:
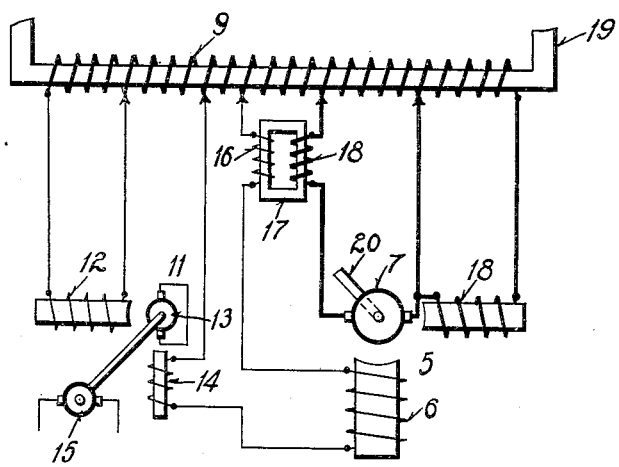

Fig. 4 shows a circuit which, in its operating characteristics, is essentially the same as that of Fig. 1. The main field winding 12 of the auxiliary machine 11 is energized from the source 8, and the electromotive force of the generating winding 14 thereof is combined with the electromotive force of a portion of the secondary winding 9 and also with the electromotive force of the secondary winding 16 of a transformer 17, the primary winding of which is connected in the main motor circuit, for the excitation of the main field winding 6 of the motor 5. By this means, a greater range of phase angle of the current in the winding 6 with respect to the main load current of the motor 5 is obtainable with consequent greater flexibility of control.

For a more detailed understanding of the operation of the system of Fig. 4, particularly during regeneration, attention is directed to the vector diagrams of Fig. 7 and Fig. 8, which respectively show the general relation of exciting and working currents and voltages of the system, and the relation of the short-circuit voltage, caused by transformer action in the armature, and the reactance voltage thereof to the neutralizing voltage that is induced by the inducing field winding.

Referring to Fig. 7, the vector $I_r$ represents the regenerative current in the main armature, and $I_{r'}$ represents the regenerative current in the inducing field winding. These two currents oppose each other in magnetizing the inducing field winding, and, therefore, $I_r$ and $-I_{r'}$, when vectorially added, produce $I_c$, which equals the inducing-field-winding magnetizing current.

In the series transformer 17, the exciting-field-winding current, represented by $I_t$, and the regenerative armature current, $I_r$, vectorially combine to produce the magnetizing effort $I_{rf}$.

Let $E$ equal the voltage across the terminals of the armature circuit and $E'$ equal the voltage across the terminals of the inducing-field-winding circuit. Then the effective inducing field voltage is obtained by adding to $E'$ the inducing-field reactive voltage $l_c$ and the ohmic drop $r_c$, whereby the vector $E_c$ is obtained, which must be at right angles to $I_c$, the inducing field magnetizing current, and to the inducing field flux in phase with $I_c$.

The effective armature voltage is obtained by adding to the armature-circuit voltage $E$ the armature reactive drop $l_a$ and the armature ohmic drop $r_a$. In addition, the voltage of the transformer, $E_{rf}$, which is at right angles to the magnetizing effort $I_{rf}$, must also be added, whereby the vector $E_a$ is produced. The vectorial sum of $E_a$ and $E_c$, that is, $-E_r$, the resultant of the effective armature voltage and the effective inducing-field voltage, must oppose the rotational counter-electromotive force $E_r$, which is in phase with the exciting field current $I_t$.

The exciting field voltage $E_f$, in quadrature relation to $I_t$, is obtained by subtracting the transformer voltage $E_{rf}$ from the constant exciter voltage $E_e$.

It will be evident that the magnetizing effort $I_{rf}$ increases with the regenerative armature current $I_r$ and that $E_{rf}$ simultaneously is increased. Consequently, since the exciter voltage $E_e$ is substantially constant, the exciting field voltage and the exciting field current $E_f$ and $I_f$, respectively, are inherently caused to decrease. In this way, the desired "negative compound" action, which tends to stabilize regenerative operation, is inherently secured by the illustrated system.

Referring to Fig. 8, $e_p$ represents the short-circuit voltage that is induced in the armature conductors by the transformer action of the exciting field voltage and is in phase with that voltage; $e_r$ represents the armature reactance voltage which is in phase with the armature current, and $e_{r'}$, the resultant of the two voltages just mentioned, is substantially exactly opposite in both phase and magnitude to the neutralizing voltage $e_c$ that is induced by the magnetizing current $I_c$ of the inducing field winding, which current is in phase with the neutralizing voltage $e_c$. Consequently, excellent commutating conditions are produced in the illustrated system by reason of the phase shifting in the main-armature circuit that is caused by the series transformer 17.

A phase converter of the induction type may be employed in any modification rather than one of the commutator type, and I have shown such a system in Fig. 5, the general connections being the same as hitherto described in connection with Fig. 3.

When it is desired to obtain an effective and flexible control of the phase relation of the exciting current for power-factor or load adjustment or for compensation for the voltage drop within the exciter machine, I may employ a phase converter of the induction type described and claimed in my copending application, Serial No. 819,737, filed Feb. 19, 1914 and assigned to the Westinghouse Electric & Manufacturing Company. A circuit embodying a device of this character is shown in Fig. 6 wherein the cross field winding 14 of the phase converter 11 is provided with a multiplicity of taps, and the magnetic axis of the winding may be shifted by adjustment of a suitable switching device 21.

This case may be considered as disclosing improvements over the device of my copending application, Serial No. 19,460, filed Apr. 6, 1915, and assigned to the Westinghouse Electric & Manufacturing Company wherein I have disclosed the broad idea of combining quadrature exciting current from a phase converter with a voltage derived from the source for load and power-factor control in regenerating systems.

Throughout this case, I have laid stress on the advantages of my exciting system in connection with motor operation, pointing out the beneficial effects on the power-factor and speed characteristics of the machine in question, but it is equally beneficial with a commutating machine operating as a generator in that it provides a simple automatic control of the amount and phase of the energy returned to the source during regeneration.

While I have shown my invention as embodied in four distinct forms, it is obvious to those skilled in the art that it is susceptible of various minor changes and modifications without departing from the spirit thereof, and I desire, therefore, that no limitations shall be placed thereupon except such as are imposed by the prior or specifically set forth in the subjoined claims.

I claim as my invention:

1. The combination with a main source of alternating current, of an alternating-current machine of the commutator type provided with an armature, exciting-field conductors, and an inducing field winding for influencing the machine commutation, connections from portions of said source for establishing a circuit containing the armature and another circuit containing said inducing field winding, an auxiliary source of dephased alternating-current electromotive force connected in an exciting circuit with said exciting-field conductors, and means for inductively interlinking a current from the auxiliary source with the current of another circuit to influence the current in said exciting circuit, the inductively interlinking means also modifying the phase relation of the current in the circuit containing said armature relative to that of the current in the circuit containing said inducing field winding.

2. The combination with a main source of alternating current, of an alternating-current machine of the commutator type provided with an armature, exciting-field conductors, and an inducing field winding for influencing the machine commutation, connections from portions of said source for establishing a circuit containing the armature and another circuit containing said inducing field winding, an auxiliary exciter machine connected in an exciting circuit with said exciting-field conductors, and means for inductively interlinking the exciting and armature circuits in such manner that the resultant of the short-circuit voltage induced in the armature conductors by the exciting voltage and the armature reactance voltage is substantially exactly neutralized in phase and in magnitude by the voltage induced in the armature by the inducing field winding.

3. The combination with a main source of alternating current, of an alternating-current machine of the commutator type provided with an armature, exciting-field conductors, and an inducing field winding for influencing the machine commutation, connections from portions of said source for establishing a circuit containing the armature and another circuit containing said inducing field winding, an auxiliary exciter machine connected in an exciting circuit with said exciting-field conductors, and means for inductively interlinking the exciting and armature circuits in such manner that an increase of armature current and of corresponding main-source voltage inherently causes a corresponding decrease of exciting current and voltage and also that the phase relation of the armature circuit is simultaneously modified to improve commutating conditions.

4. The combination with a main source of single-phase current, of an alternating-current machine of the commutator type provided with an armature, an exciting field winding and an inducing field winding for influencing the machine commutation, connections from contiguous portions of said source for establishing a circuit containing the armature and another circuit containing said inducing field winding, an auxiliary dynamo-electric machine connected in circuit with said exciting field winding and with a portion of said source, and a transformer having its primary winding connected in series relation with said armature and its secondary winding connected in series relation with the exciting circuit, whereby an increase of armature current and of corresponding main-source voltage inherently causes a corresponding decrease of exciting current and voltage and simultaneously modifies the phase relation of the armature circuit to improve commutating conditions.

In testimony whereof, I have hereunto subscribed my name this 23rd day of April 1915.

RUDOLF E. HELLMUND.